(12) United States Patent
Song et al.

(10) Patent No.: US 10,529,319 B2
(45) Date of Patent: Jan. 7, 2020

(54) USER ADAPTIVE SPEECH RECOGNITION METHOD AND APPARATUS

(71) Applicant: SAMSUNG ELECTRONICS CO., LTD., Suwon-si (KR)

(72) Inventors: Inchul Song, Suwon-si (KR); Sang Hyun Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 85 days.

(21) Appl. No.: 15/855,456

(22) Filed: Dec. 27, 2017

(65) Prior Publication Data

US 2018/0336887 A1    Nov. 22, 2018

(30) Foreign Application Priority Data

May 22, 2017   (KR) .................. 10-2017-0062842
Oct. 20, 2017  (KR) .................. 10-2017-0136510

(51) Int. Cl.

| | | |
|---|---|---|
| G10L 15/16 | (2006.01) | |
| G10L 15/02 | (2006.01) | |
| G10L 15/22 | (2006.01) | |
| G06N 3/02  | (2006.01) | |
| G10L 15/07 | (2013.01) | |
| G06N 3/04  | (2006.01) | |

(Continued)

(52) U.S. Cl.
CPC .............. *G10L 15/16* (2013.01); *G06N 3/02* (2013.01); *G06N 3/0445* (2013.01);
(Continued)

(58) Field of Classification Search
CPC ......... G10L 15/16; G10L 15/02; G10L 15/22; G10L 17/18; G10L 17/04; G10L 15/265;
(Continued)

(56) References Cited

U.S. PATENT DOCUMENTS 8,874,496 B2   10/2014 Lazar et al.
9,401,143 B2    7/2016 Senior et al.
(Continued)

FOREIGN PATENT DOCUMENTS

JP         4552464 B2    9/2010
KR    10-1412727 B1    7/2014

OTHER PUBLICATIONS

Dehak, N., et al., "Front-End Factor Analysis For Speaker Verification," *IEEE Transactions on Audio, Speech, and Language Processing*, vol. 19, No. 4, May, 2011 (pp. 788-798).

(Continued)

*Primary Examiner* — Yogeshkumar Patel
(74) *Attorney, Agent, or Firm* — NSIP Law

(57) ABSTRACT

A user adaptive speech recognition method and apparatus are provided. A speech recognition method includes extracting an identity vector representing an individual characteristic of a user from speech data, implementing a sub-neural network by inputting a sub-input vector including at least the identity vector to the sub-neural network, determining a scaling factor based on a result of the implementing of the sub-neural network, implementing a main neural network, configured to perform a recognition operation, by applying the determined scaling factor to the main neural network and inputting the speech data to the main neural network to which the determined scaling factor is applied, and indicating a recognition result of the implementation of the main neural network.

28 Claims, 6 Drawing Sheets

(51) Int. Cl.
*G06N 3/08* (2006.01)
*G10L 15/14* (2006.01)
*G06N 7/00* (2006.01)

(52) U.S. Cl.
CPC ............. *G06N 3/0454* (2013.01); *G06N 3/08* (2013.01); *G10L 15/02* (2013.01); *G10L 15/075* (2013.01); *G10L 15/22* (2013.01); *G06N 7/005* (2013.01); *G10L 15/14* (2013.01)

(58) Field of Classification Search
CPC ......... G10L 15/075; G10L 15/14; G06N 3/08; G06N 3/0454; G06N 3/02
USPC .................................................. 704/232, 202
See application file for complete search history.

(56) References Cited

U.S. PATENT DOCUMENTS

| | | | |
|---|---|---|---|
| 9,519,858 B2 | 12/2016 | Zweig et al. | |
| 9,558,742 B2 | 1/2017 | Yu et al. | |
| 2015/0039301 A1* | 2/2015 | Senior | G10L 15/16 704/232 |
| 2015/0149165 A1 | 5/2015 | Saon | |
| 2016/0180215 A1 | 6/2016 | Vinyals et al. | |
| 2016/0350655 A1 | 12/2016 | Weiss et al. | |
| 2016/0379113 A1 | 12/2016 | Gruenstein | |
| 2017/0169815 A1* | 6/2017 | Zhan | G10L 15/075 |
| 2018/0061397 A1* | 3/2018 | Huang | G06N 3/0445 |

OTHER PUBLICATIONS

Glembek, O., et al., "Simplification and Optimization of I-Vector Extraction," *IEEE International Conference on Acoustics, Speech and Signal Processing (ICASSP)*, 2011 (pp. 4516-4519).

Saon, G., et al., "Speaker Adaptation of Neural Network Acoustic Models Using I-Vectors," *ASRU* 2013 (pp. 55-59).

Swietojanski, P., et al., "Learning Hidden Unit Contributions for Unsupervised Acoustic Model Adaptation," *IEEE/ACM Transactions on Audio, Speech, and Language Processing*, vol. 24, No. 8, 2016 (pp. 1450-1463).

* cited by examiner

100

USER ADAPTIVE SPEECH RECOGNITION METHOD AND APPARATUS

CROSS-REFERENCE TO RELATED APPLICATION(S)

This application claims the benefit under 35 USC § 119(a) of Korean Patent Application No. 10-2017-0062842, filed on May 22, 2017, and Korean Patent Application No. 10-2017-0136510, filed on Oct. 20, 2017, in the Korean Intellectual Property Office, the entire disclosures of which are incorporated herein by reference for all purposes.

BACKGROUND

1. Field

The following description relates to a user adaptive speech recognition method and apparatus.

2. Description of Related Art

Recently, a technological automation of speech recognition has been implemented through processor implemented neural network models, as specialized computational architectures, that after substantial training may provide computationally intuitive mappings between input patterns and output patterns. The trained capability of generating such mappings may be referred to as a learning capability of the neural network. Further, because of the specialized training, such specially trained neural network may thereby have a generalization capability of generating a relatively accurate output with respect to an input pattern that the neural network may not have been trained for, for example.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, a processor implemented speech recognition method includes extracting an identity vector representing an individual characteristic of a user from speech data, implementing a sub-neural network by inputting a sub-input vector including at least the identity vector to the sub-neural network, determining a scaling factor based on a result of the implementing of the sub-neural network, implementing a main neural network, configured to perform a recognition operation, by applying the determined scaling factor to the main neural network and inputting the speech data to the main neural network to which the determined scaling factor is applied, and indicating a recognition result of the implementation of the main neural network.

The extracting of the identity vector may include generating the identify vector as representing a variability of a Gaussian mixture model (GMM) supervector connecting average values of Gaussian components modeling a distribution of acoustic parameters of the speech data based on a GMM.

The main neural network may be a recurrent neural network (RNN), and the applying of the determined scaling factor to the main neural network may include adjusting a state of a hidden unit in the RNN based on the determined scaling factor.

The main neural network may be an RNN, with weights of the RNN having been trained in advance of the recognition operation, and the applying of the determined scaling factor to the main neural network may include scaling a hidden state vector of a hidden unit in the RNN calculated based on the weights.

The main neural network may be a deep neural network (DNN), and the applying of the determined scaling factor to the main neural network may include adjusting an output of a hidden layer in the DNN based on the determined scaling factor.

The main neural network may be a DNN, with weights of the DNN having been trained in advance of the recognition operation, and the applying of the determined scaling factor to the main neural network may include scaling an output vector of a hidden layer in the DNN calculated based on the weights.

The recognition result may reflect consideration of the individual characteristic of the user in the recognition operation, corresponding to the extracted identity vector.

The sub-input vector may further include the speech data.

The scaling factor may include, with respect to the applying of the determined scaling factor, a first parameter controlling a degree of scaling and a second parameter controlling a scaling range.

The sub-neural network may be a neural network with parameters having been trained, prior to the recognition operation, to output a component determinative of the scaling factor and in response to the input of the sub-input vector to the sub-neural network, and the main neural network may be a neural network with parameters having been trained, prior to the recognition operation, to output the recognition result in response to the inputting of the speech data to the main neural network to which the scaling factor is applied.

The sub-neural network and the main neural network may be neural networks with respective parameters resulting from the sub-neural network and the main neural network being simultaneously trained together.

In one general aspect, provided is a non-transitory computer-readable storage medium storing instructions, which when executed by a processor, cause the processor to perform one or more or all operations and processes described herein.

In one general aspect, a speech recognition apparatus includes a processor configured to extract an identity vector representing an individual characteristic of a user from speech data, implement a sub-neural network by inputting a sub-input vector including at least the identity vector to the sub-neural network, determine a scaling factor based on a result of the implementing of the sub-neural network, implement a main neural network, configured to perform a recognition operation, by applying the determined scaling factor to the main neural network and inputting the speech data to the main neural network to which the determined scaling factor is applied, and indicate a recognition result of the implementation of the main neural network.

The speech recognition apparatus may further include a memory configured to store instructions, which when executed by the processor, cause the processor to perform the extracting of the identity vector, the implementing of the sub-neural network, the determining of the scaling factor, the implementing of the main neural network, and the indicating of the recognition result.

The speech recognition apparatus may further include a memory storing trained parameters of the sub-neural network and trained parameters of the main neural network.

To perform the extracting of the identify vector, the processor may be configured to generate the identify vector as representing a variability of a Gaussian mixture model (GMM) supervector connecting average values of Gaussian components modeling a distribution of acoustic parameters of the speech data based on a GMM.

The main neural network may be a recurrent neural network (RNN), and, to perform the applying of the determined scaling factor to the main neural network, the processor may be configured to adjust a state of a hidden unit in the RNN based on the determined scaling factor.

The main neural network may be an RNN, with weights of the RNN having been trained in advance of the recognition operation, and, to perform the applying of the determined scaling factor to the main neural network, the processor may be configured scale a hidden state vector of a hidden unit in the RNN calculated based on the weights.

The main neural network may be a deep neural network (DNN), and, to perform the applying of the determined scaling factor to the main neural network, the processor may be configured to adjust an output of a hidden layer in the DNN.

The main neural network may be a DNN, with weights of the DNN having been trained in advance of the recognition operation, and, to perform the applying of the determined scaling factor to the main neural network, the processor may be configured to scale an output vector of a hidden layer in the DNN calculated based on the weights.

The recognition result may reflect consideration of the individual characteristic of the user in the recognition operation, corresponding to the extracted identity vector.

The sub-input vector may further include the speech data.

The scaling factor may include, with respect to the applying of the determined scaling factor, a first parameter controlling a degree of scaling and a second parameter controlling a scaling range.

The sub-neural network may be a neural network with parameters having been trained, prior to the recognition operation, to output a component determinative of the scaling factor and in response to the input of the sub-input vector to the sub-neural network, and the main neural network may be a neural network with parameters having been trained, prior to the recognition operation, to output the recognition result in response to the inputting of the speech data to the main neural network to which the scaling factor is applied.

The processor may be further configured to train the sub-neural network and the main neural network simultaneously together based on respectively extracted identity vectors of different user training speech data used in the training.

In one general aspect, a processor implemented speech recognition method includes extracting an identity vector representing an individual characteristic of a user from speech data, generating a scaling factor based on a result of an implementing of a sub-neural network input the identify vector, and implementing a main neural network, configured to perform a recognition operation, by applying the determined scaling factor to the main neural network and inputting the speech data to the main neural network to which the determined scaling factor is applied, wherein the sub-neural network and the main neural network are neural networks with respective parameters resulting from the sub-neural network and the main neural network being simultaneously trained together for performing respectively individualized speech recognition of different training user speeches each with respectively different individual characteristics.

The extracting of the identity vector may include generating the identify vector as representing a variability of a Gaussian mixture model (GMM) supervector connecting average values of Gaussian components modeling a distribution of acoustic parameters of the speech data based on a GMM.

The generating of the scaling factor may include generating a first scaling factor and a second scaling factor respectively based on results of different network portions of the sub-neural network, and the applying of the determined scaling factor to the main neural network may include applying the first scaling factor to a first hidden layer of the main neural network and applying the second scaling factor to a second hidden layer of the main neural network.

Other features and aspects will be apparent from the following detailed description, the drawings, and the claims.

Figure 1:
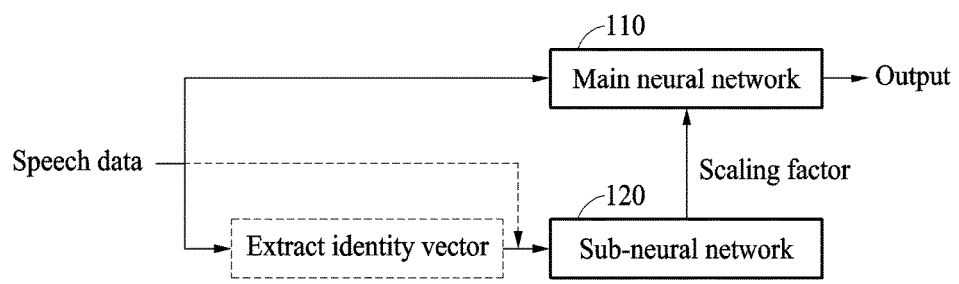
FIG. 1 is a diagram illustrating an example of a speech recognition apparatus.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. The sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. For example, as used herein, singular forms are intended to include plural forms as well, unless the context clearly indicates otherwise. As used herein, the singular forms "a," "an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. As further used herein, the term "and/or" includes any and all combinations of one or more of the associated listed items. Expressions such as "at least one of," when preceding a list of elements, modify the entire list of elements and do not modify the individual elements of the list.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "coupled," or "joined" to another component, a third component may be "coupled," and "joined" between the first and second components, although the first component may be directly coupled or joined to the second component. In addition, it should be noted that if it is described in the specification that one component is "directly coupled" or "directly joined" to another component, a third component may not be present therebetween. Likewise, expressions, for example, "between" and "immediately between" and "adjacent to" and "immediately adjacent to" may also be construed as described in the foregoing. The use of the term 'may' herein with respect to an example or embodiment, e.g., as to what an example or embodiment may include or implement, means that at least one example or embodiment exists where such a feature is included or implemented while all examples and embodiments are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

FIG. 1 illustrates an example of a speech recognition apparatus 100. Referring to FIG. 1, the speech recognition apparatus 100 includes a main neural network 110 and a sub-neural network 120. In an example, such as demonstrated in any of FIGS. 6-8, the speech recognition apparatus 100 may include a memory configured to store instructions for one or more or all operations that will be described in greater detail further below, and one or more processors configured to execute such instructions and/or otherwise configured to implement such one or more or all operations described herein. In an example, respective configurations of the example main neural network 110 and the sub-neural network 120 may be stored in the memory of the speech recognition apparatus 100, such as through respective hyper parameters and trained parameters, e.g., as trained connection weights and/or kernels, which when read and implemented by a processor/processing element of the recognition apparatus 100 the main neural network 110 and the sub-neural network 120 are thereby configured. Each of the main neural network 110 and the sub-neural network 120 may be, for example, a deep neural network (DNN) or may be a recurrent neural network (RNN).

The main neural network 110 and the sub-neural network 120 each may be respective neural networks that each include a plurality of layers, or may be different portions of a single neural network. Each of the plurality of layers may include a plurality of nodes, which may be defined and configured to perform predetermined activations of activation results from previous layers or of inputs based on the trained parameters for particular defined objectives. For example, nodes of hierarchically or laterally neighboring layers may be connected by weighted connections, as an example of the trained parameters. In addition, weighted connections may further include kernels for convolutional layers and/or recurrent connections for recurrent layers. For example, after substantial repetitive adjustments during training of either or both of the main neural network 110 and the sub-neural network 120 the corresponding weights of such connections are assigned. The trained parameters may thus be stored in the memory of the speech recognition apparatus 100, and when acquired or loaded from the memory and then implemented by one or more processor/processing elements of the speech recognition apparatus 100 the main neural network 110 and the sub-neural network 120 are thereby configured in the speech recognition apparatus 100 and so respective objectives the main neural network 110 and the sub-neural network 120 may be achieved for information provided to the main neural network 110 and the sub-neural network 120, as discussed in greater detail further below.

The plurality of layers of each of the neural networks may include at least an input layer, a hidden layer, and an output layer, for example. During training, the input layer may be provided training data, e.g., to train the neural network and assign the trained parameters, such as through a supervised training approach. During implementation of the neural network based on non-training data, for example, the input layer receives an input for which recognition is to be performed, such as from captured audio of a voice. Each respective input layer thus transmits the input to an example first hidden layer. The example output layer may generate an output of the corresponding neural network based on outputs from nodes of the example first hidden layer, such as in the example where there is a single hidden layer. Thus, the hidden layer is an intermediate layer disposed between the input layer and the output layer. Depending on the training or implementation examples, the hidden layer(s) may thus extract features from, and/or transform the training data or recognition target data received from, the input layer to values or information that can then be used to predict or estimate the training data or recognition target data in the respective training or recognition implementation operations.

Thus, for example, the main neural network 110 receives speech data and outputs a recognition result corresponding to the speech data, such as being further based on one or more scaling factors, i.e., based on such scaling factors in addition to the example weighted connections. The speech data may be referred to as a "speech sequence," and may include a plurality of speech frames, for example. For example, during a preprocessing operation by one or more processors of the speech recognition apparatus 100, a captured speech signal may be digitized and divided into a plurality of speech frames. Herein, a frame may also be referred to as a window. Each of the speech frames may correspond to feature vectors extracted from a speech signal acquired based on a speech input of a user. For example, one or more processors of the speech recognition apparatus 100 may extract a feature from a speech signal and thereby generate the speech data based on sequence of the extracted features.

For example, the main neural network 110 is configured to include an acoustic model, for example. As only an example, such an acoustic model may be configured to output information related to, or indicative of, a most likely or closest phoneme, for example, corresponding to each frame of the input speech signal. For example, the acoustic model may provide an indication of the most likely phoneme recognition of frame(s) of the input voice signal. As an example, the indication may be represented by a state, multi-dimensional vector, or probabilistic value(s). Based on the information output from the acoustic model, the speech recognition apparatus 100 may verify a word or a sentence closest to the input voice signal. The main neural network 110 may further be configured to include a language model and a decoder, such that such information of the phoneme recognitions from the acoustic model can be combined, e.g., by the decoder, with information from the language model based on the input voice signal, to similarly output a most likely or highest probabilistic word, phrase, or sentence for the input voice signal. In such examples, a recognition result output from the main neural network 110 may also or alternatively include a speech score of each of frames included in speech data. As noted, the acoustic model may be used as a portion of a speech recognition engine, such as with the speech recognition engine further including a language model and/or decoder in differing examples. The acoustic model may accordingly provide information about which pronunciation of available pronunciations is most or more similar to each of frames in an input speech signal, while the language model and/or decoder may further calculate which word, phrase, or sentence is more or most similar to the input speech based on the information provided by the acoustic model.

The speech recognition apparatus 100 extracts an identity vector from the speech data, and constructs a sub-input vector based on the identity vector. For example, one or more identity vectors may be extracted for each of the frames of the speech data, or extracted at preset intervals from the speech data. In another example, a single identity vector may be extracted from the speech data by the speech recognition apparatus 100 for the frames of the speech data. Thus, noting that alternative examples are included, for brevity purposes in the following description, a single identity vector having a predetermined value will be discussed/assumed as being used for each respective frame. The identity vector represents an individual characteristic of a user. As a non-limiting example, the identity vector is a vector, generated by the speech recognition apparatus 100, representing the variability of a Gaussian mixture model (GMM) supervector, generated by the speech recognition apparatus 100, connecting average values of Gaussian components when the speech recognition apparatus 100 models a distribution of acoustic parameters extracted from the corresponding speech data based on a GMM, for example. Further discussions of identify vectors can be found in Glembek et al., "Simplification and Optimization of I-Vector Extraction", ICASSP 2011, and Dehak et al., "Front-End Factor Analysis for Speaker Verification" IEEE Transactions on Audio, Speech, and Language Processing, Vol. 19, No. 4, May 2011, the disclosures of which are incorporated herein.

The sub-input vector is a vector that is input to the sub-neural network 120. For example, the sub-input vector includes an identity vector, or the sub-input vector includes speech data together with the identity vector.

The speech recognition apparatus 100 inputs such a sub-input vector including an identity vector to the sub-neural network 120. The sub-neural network 120 is trained in advance to output a component to determine a scaling factor in response to the sub-input vector being input. The speech recognition apparatus 100 determines a scaling factor based on an output of the sub-neural network 120, and selectively applies the determined scaling factor to the main neural network 110.

In an example, the sub-neural network 120 is an RNN. In this example, a sub-input vector at a time step t includes a hidden state vector from a time step t-1, speech data at the time step t, and an identity vector. Sub-input vectors are generated for every time step, and accordingly a scaling factor is determined for every time step of speech data. The speech recognition apparatus 100 determines a scaling factor for every time step and applies the determined scaling factor to the main neural network 110, while recognizing speech data.

In another example, the sub-neural network 120 is a DNN. In this example, a sub-input vector includes the identity vector. For example, the identity vector, as a sub-input vector, is input to the sub-neural network 120. In this example, the sub-input vector may have the same value regardless of a time step, and accordingly a scaling factor may be determined once with respect to the speech data for multiple time steps. The above scaling factor is referred to as a representative scaling factor. For example, the speech recognition apparatus 100 may extract an identity vector from speech data before a recognition operation of the main neural network 110, input the identity vector to the sub-neural network 120, and determine a representative scaling factor based on an output of the sub-neural network 120. The speech recognition apparatus 100 may store the representative scaling factor, and then apply the representative scaling factor to the main neural network 110 while recognizing the speech data.

The speech recognition apparatus 100 inputs speech data to the main neural network 110 to which the scaling factor is applied, and acquires a recognition result of the speech data output from the main neural network 110. The main neural network 110 is trained in advance to output the recognition result of the speech data in response to the speech data being input and a corresponding scaling factor being applied. Accordingly, the main neural network 110 operates based on the output of the sub-neural network 120, and thus the main neural network 110 and the sub-neural network 120 may be simultaneously trained together.

Typically, individual characteristics of a user are reflected in the captured speech data input to a recognition model, thus an accuracy of the speech recognition may be reduced due to the reflected individual characteristics of a user, for example, due to varied dialects or pronunciation habits of various users. Likewise, when a recognition model, for example, is trained in advance based on individual characteristics of a particular predetermined user, it is difficult to use the particular user trained recognition model for other users.

Rather, as discussed above, in an example, an individual characteristic may be reflected on the recognition result of the main neural network 110 provided the speech data and through the corresponding to the determined identification vector. Also, the sub-neural network 120 may be trained in advance to output a component to determine different scaling factors, respectively based on different identity vectors, and a user adaptive speech recognition is performed by the main neural network 110 using the results of the sub-neural network 120.

Figure 2:
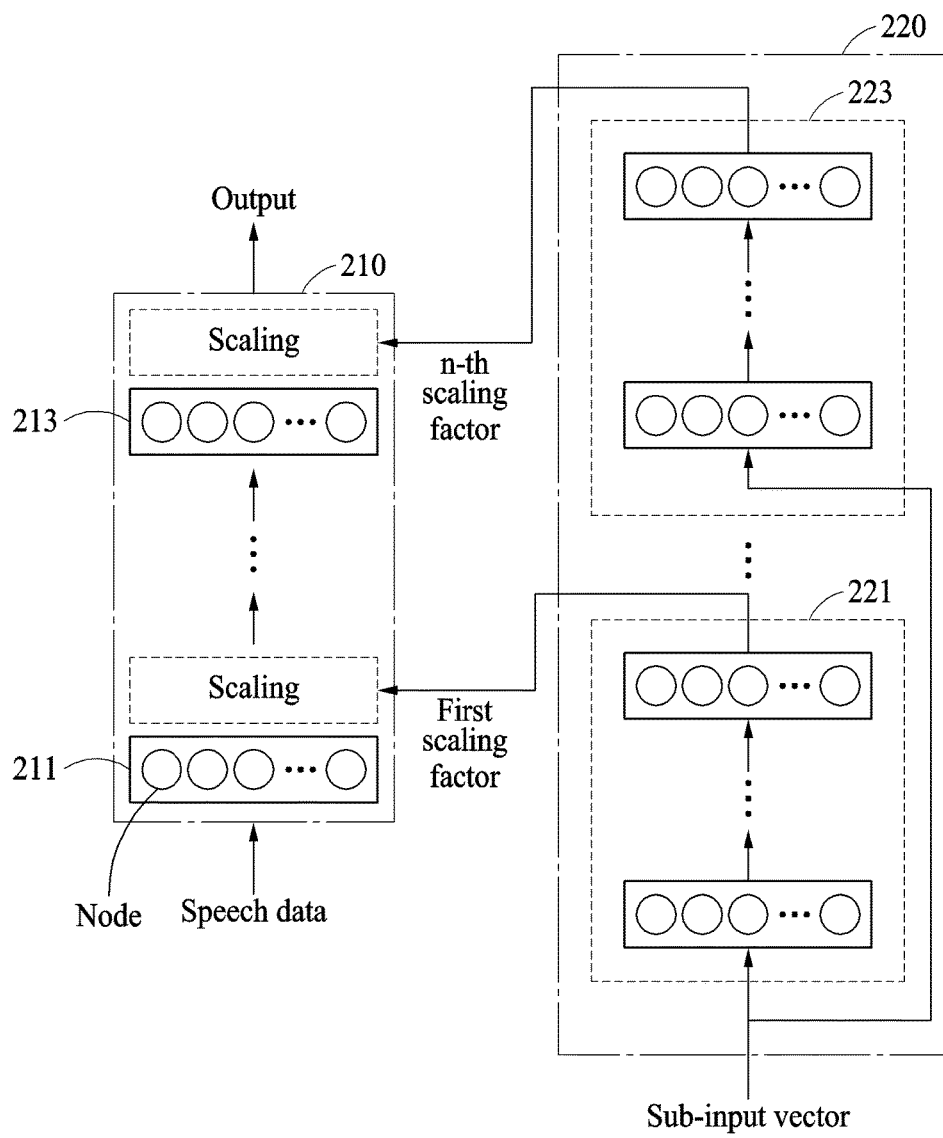
FIG. 2 is a diagram illustrating an example of a main neural network and a sub-neural network.

FIG. 2 illustrates an example of a main neural network 210 and a sub-neural network 220. Referring to FIG. 2, the main neural network 210 includes a first hidden layer 211 through an n-th hidden layer 213. Although FIG. 2 illustrates two hidden layers (the first hidden layer 211 and the n-th hidden layer 213) in the main neural network 210, this illustration is merely for convenience of description, as the main neural network 210 may alternatively represent a single hidden layer or three or more such hidden layers. Also, the main neural network 210 may include an input layer and an output layer, e.g., respectively before the first hidden layer 211 and after the n-th hidden layer 213. As noted above, each of hidden layers in the main neural network 210 includes a plurality of nodes, with nodes included within and/or in neighboring hierarchical layers in the main neural network 210 being respectively connected to each other through weighted connections. The weighted connections are trained in advance of a recognition operation. The main neural network 210 outputs a recognition result of speech data in response to an input of the speech data.

For one or more or each of the hidden layers in the main neural network 210, there may be a scaling operation performed, illustrated with the dashed 'scaling' identifiers in FIG. 2 and based on a respectively provided scaling factor, and performed with respect to a result of each of the one or more or each hidden layer. For example, the illustrated scaling operation based on a provided first scaling factor is performed with respect to the result of the first hidden layer 211, and the illustrated scaling operation based on the provided n-th scaling factor is performed with respect to the result of the n-th hidden layer 213. In an example, when the main neural network 210 is an RNN, a state of a hidden unit in the RNN may be adjusted by a scaling factor. In another example, when the main neural network 210 is a DNN, an output of a hidden layer in the DNN may be adjusted by a scaling factor. For example, the main neural network 210 and the sub-neural network 220 are illustrated as DNNs in FIG. 2, however, main neural network 210 may be an RNN and the sub-neural network 220 a DNN, the main neural network 210 may be a DNN and the sub-neural network 220 an RNN, or the main neural network 210 may be an RNN and the sub-neural network 220 an RNN.

Referring to FIG. 2, the sub-neural network 220 includes a first network 221 through an n-th network 223. Although FIG. 2 illustrates two networks (the first network 221 and the n-th network 223) in the sub-neural network 220, this illustration is merely for convenience of description, as the sub-neural network 220 may alternatively represent any number of networks corresponding to a number of hidden layers in the main neural network 210 or a corresponding same number of networks as the select number of hidden layers in the main neural network 210 for which respective scaling factors are applied. Each of the first network 221 through the n-th network 223 in the sub-neural network 220 may include an input layer, one or more hidden layers, and an output layer. Each of hidden layers of each of the respective networks included in the sub-neural network 220 includes a plurality of nodes, with corresponding nodes included within and/or in neighboring hierarchical layers in each of the networks being respectively connected to each other through weighted connections. The weighted connections are trained in advance of a recognition operation. Each of the networks in the sub-neural network 220 outputs at least one corresponding component as a corresponding scaling factor, or for determining the corresponding scaling factor, in response to an input of sub-input vector data.

For example, the example first scaling factor is determined based on an output of the first network 221, and the example n-th scaling factor is determined based on an output of the n-th network 223. The respective scaling factors may be determined based on an output of each of the networks in the sub-neural network 220, or based on predetermined respective processings of the outputs of each of the networks in the sub-neural network 220, which will be described in greater detail further below. In an example, when the sub-neural network 220 is an RNN, respective outputs of each of the networks in the sub-neural network 220 indicate a corresponding hidden state of each of the networks in the sub-neural network 220. In another example, when the sub-neural network 220 is a DNN, respective identity vectors as the respective sub-input vectors are input to the sub-neural network 220, and respective scaling factors are acquired based on corresponding network outputs of the sub-neural network 220. The acquired scaling factors may be stored as a representative scaling factor in a storage, for example, a memory, and then applied to the main neural network 210 during a recognition operation of the main neural network 210. In an alternative example, the scaling factors are determined as the network outputs of the sub-neural network 220, or determined from the layer outputs, and applied to the main neural network 210, during the recognition operation of the main neural network 210.

Figure 3:
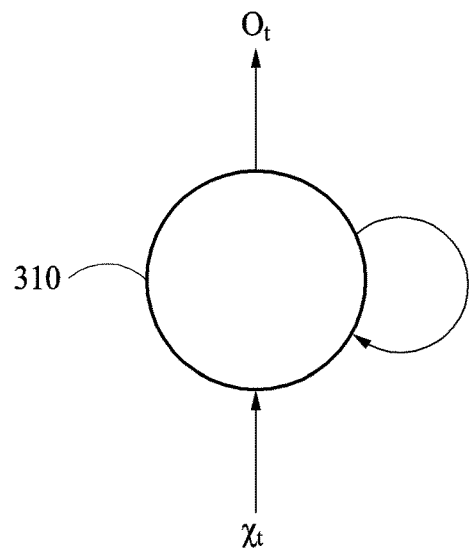
FIG. 3 is a diagram illustrating an example of a recurrent connection of a recurrent model.

FIG. 3 illustrates an example of a recurrent connection of a recurrent model. Referring to FIG. 3, the recurrent connection is illustrated as a recurrent loop. For example, an output of a recurrent layer from a previous time may be input to the recurrent layer in a current time along with input to the recurrent layer, e.g., from an output of a previous layer. For example, the recurrent model includes a node 310 that is input an input $X_t$ at a current time t along with an output $O_{t-1}$ of the node 310 from a previous time t-1, to output $O_t$ at the current time. The output $O_t$ of the node 310 is then again input to the node 310 in a future time for consideration in the future time. An RNN is thus implemented based on the example recurrent connection. In the following description, a parameter indicating a value associated with the recurrent layer node 310 is referred to as a "state parameter." For example, the state parameter includes an output value of the node 310.

As a non-limiting example, the recurrent model with recurrent connections may be implemented as, for example, a long short-term memory (LSTM) or gated recurrent units (GRUs). Thus, in the recurrent model, the example node 310 may include a plurality of gates. The state parameter of the node 310 may include a vector representing a cell state of the node 310, with the vector representing the cell state of the node 310 being referred to as a "state vector." The state vector is accordingly controlled based on the gates of the node 310. Again, with the example recurrent connection of FIG. 3, the output $O_t$ is frame data that is output from the recurrent model at a time step t, and the input $X_t$ is a frame data that is input to the recurrent model at the time step t, along with an example output $O_{t-1}$ from a previous time step t-1 being input to the recurrent model at the time step t.

Figure 4:
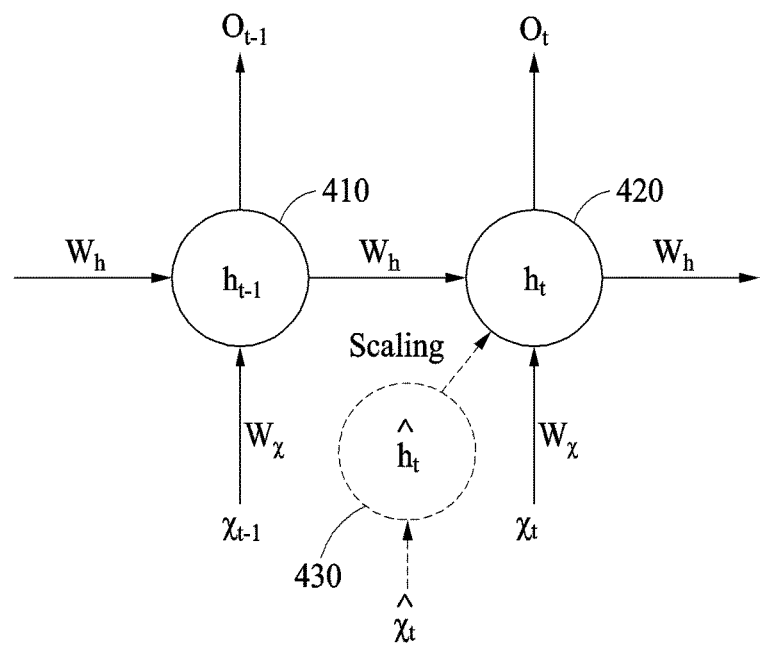
FIG. 4 is a diagram illustrating an example of a speech recognition process in a recurrent neural network (RNN).

FIG. 4 illustrates an example of a speech recognition process of a main neural network that is an RNN. Referring to FIG. 4, the main neural network is an RNN and includes hidden units or nodes 410 and 420, illustrated in an unfolded state. Each of the hidden units 410 and 420 corresponds to a same unit or node, e.g., corresponding to node 310 of FIG. 3, but with the different time steps being separately illustrated, i.e., in the unfolded state. Although the hidden unit 410 at a time step t-1 and the hidden unit 420 at a time step t in the main neural network are illustrated in FIG. 4, these hidden units 410 and 420 should be understood to represent multiple hidden units of the main neural network, i.e., corresponding to multiple nodes 310 of FIG. 3. For example, an unfolded length of the main neural network corresponds to a length of speech data or a window size of speech data or corresponding to the length of time between the current time step t and the example previous time step t-1. The hidden units 410 and 420 are included in a single layer, and as noted above may be the same node unfolded into different time steps. The main neural network may include a larger number of layers in addition to the example layer that includes the hidden units 410 and 420. A hidden state vector of the example RNN of FIG. 4 is expressed by the below Equation 1, for example.

$$h_t = \phi(W_h h_{t-1} + W_x x_t + b)$$ Equation 1:

In Equation 1, $h_t$ denotes a hidden state vector at a time step t, $\phi$ denotes a nonlinear operation, for example, a hyperbolic tangent (tan h) function and a rectified linear unit (ReLU) function of the hidden unit 420, $W_h$ of Equation 1 denotes a hidden weight (as a connection weight between hidden unit 410 and hidden unit 420) of the respective hidden weights $W_h$ of FIG. 4, $h_{t-1}$ denotes a hidden state vector at a time step t-1, $W_x$ of Equation 1 denotes an input weight (as a connection weight between a previous layer or input and hidden unit 420) of the respective input weights $W_x$, $x_t$ denotes an input vector at the time step t, and b denotes a bias. In an example, the respective weights $W_h$, $W_x$ and b of FIG. 4 may have the same value for all time steps. Also, a dimension of $x_t$ is $\mathbb{R}^{N_x}$, a dimension of $W_x$ is $\mathbb{R}^{N_h \times N_x}$, a dimension of $W_h$ is $\mathbb{R}^{N_h \times N_h}$, and a dimension of b is $\mathbb{R}^{N_h}$, where $N_h$ denotes a number of hidden units in an RNN layer.

Hereinafter, the notations of Equation 1 will be used for referring to corresponding parameters of the main neural network, while similar notations that further include a hat over a corresponding parameter of the notation of Equation 1 will be used for referring to corresponding parameters of the sub-neural network.

For example, in an example where the sub-neural network is an RNN, the sub-neural network may include hidden units and layers corresponding to the hidden units and layers of main neural network. Also, sub-input vectors generated for each time step are input to the sub-neural network, and may be expressed by the below Equation 2, for example.

$$\hat{x}_t = \begin{pmatrix} h_{t-1} \\ x_t \\ v \end{pmatrix}$$ Equation 2

In Equation 2, $\hat{x}_t$ denotes a sub-input vector at a time step t input to the illustrated sub-neural network unit 430, $h_{t-1}$ denotes the above noted hidden state vector of the unit 410 at a time step t-1, $x_t$ denotes speech data at the time step t, and $v$ denotes an identity vector. $v$ in Equation 2 has a predetermined value or is determined by the speech recognition apparatus for the speech data.

The sub-neural network outputs a component that is, or is used to determine, a scaling factor, in response to an input of the sub-input vector $\hat{x}_t$. The outputting of the component includes, for example, storing the component as a cell state value. The component includes a hidden state vector of the sub-neural network and the hidden state vector may be expressed by the below Equation 3, for example.

$$\hat{h}_t = \phi(W_{\hat{h}} \hat{h}_{t-1} + W_{\hat{x}} \hat{x}_t + \hat{b})$$ Equation 3:

In Equation 3, $\hat{h}_t$ denotes a hidden state vector at a time step t for the unit 430, $W_{\hat{h}}$ denotes a hidden weight (as a connection weight between the unit 430 at the time step t-1 and the unit 430 at the time step t), $W_{\hat{x}}$ denotes an input weight (as a connection weight between a previous layer or input and hidden unit 430), $\phi$ denotes a nonlinear operation, for example, a tan h function and an ReLU function of the hidden unit 430, $\hat{x}_t$ denotes a sub-input vector at the time step t, and $\hat{b}$ denotes a bias. In an example, $W_{\hat{h}}$, $W_{\hat{x}}$ and $\hat{b}$ may have the same value for all time steps. Also, a dimension of $W_{\hat{x}}$ is $\mathbb{R}^{N_{\hat{h}} \times (N_h + N_x + N_v)}$, a dimension of $W_{\hat{h}}$ is $\mathbb{R}^{N_{\hat{h}} \times N_{\hat{h}}}$ and a dimension of $\hat{b}$ is $\mathbb{R}^{N_{\hat{h}}}$, where $N_{\hat{h}}$ denotes a number of hidden units in the recurrent layer that includes the hidden unit 430 in the sub-neural network, $N_h$ denotes a number of hidden units in a corresponding layer of the main neural network, $N_x$ denotes a dimension of speech data, and $N_v$ denotes a dimension of an identity vector.

Because $\hat{h}_t$ is determined based on $v$, $\hat{h}_t$ varies by user and may be different for different users. Thus, a scaling factor $c_s$ for scaling of the main neural network may be determined based on $\hat{h}_t$. In an example, $\hat{h}_t$ may be used as the scaling factor $c_s$. In this example, $N_h$ is equal to $N_{\hat{h}}$. In another example, for a potential processing performance enhancement, a low-dimensional vector $z_h$ may be generated based on $\hat{h}_t$, and a high-dimensional vector $d_h(z_h)$ generated based on $z_h$ may be used as the scaling factor $c_s$. In this example, $N_z$ denoting a dimension of $z_h$ is less than $N_h$. These example $z_h$ and $d_h(z_h)$ are respectively expressed by the below Equations 4 and 5, as only examples.

$$z_h = W_{\hat{h}h} \hat{h}_t + b_{\hat{h}h}$$ Equation 4:

In Equation 4, $z_h$ denotes the low-dimensional vector based on it, $W_{\hat{h}h}$ denotes a hidden weight, $\hat{h}_t$ denotes a hidden state vector at the time step t, and $b_{\hat{h}h}$ denotes a bias. For example, $W_{\hat{h}h}$ and $b_{\hat{h}h}$ may have the same value for all time steps. Also, a dimension of $W_{\hat{h}h}$ is $\mathbb{R}^{N_z \times N_{\hat{h}}}$, and a dimension of $b_{\hat{h}h}$ is $b_{\hat{h}h}$.

$$d_h(z_h) = W_{hz} z_h$$ Equation 5:

In Equation 5, $d_h(z_h)$ denotes the high-dimensional vector based on $z_h$, and $z_h$ denotes the low-dimensional vector based on $\hat{h}_t$. When $d_h(z_h)$ is used as a scaling factor, a hidden state vector of the main neural network may be expressed by the below Equation 6, for example.

$$h_t = \psi(d_h(z_h)) \odot \phi(W_h h_{t-1} + W_x x_t + b)$$ Equation 6:

In Equation 6, $h_t$ denotes a hidden state vector at a time step t, $\psi(d_h(z_h))$ denotes a scaling factor, $\phi$ denotes a nonlinear operation, for example, a tan h function and an ReLU function, $W_h$ denotes a hidden weight, $h_{t-1}$ denotes a hidden state vector at a time step t-1, $W_x$ denotes an input weight, $x_t$ denotes speech data at the time step t, and b denotes a bias. For example, $W_h$, $W_x$ and b may have the same value for all time steps. Also, a dimension of $x_t$ is $\mathbb{R}^{N_x}$, a dimension of $W_x$ is $\mathbb{R}^{N_h \times N_x}$, a dimension of $W_h$ is $\mathbb{R}^{N_h \times N_h}$, and a dimension of b is $\mathbb{R}^{N_h}$. $N_h$ denotes a number of hidden units in an RNN.

In Equation 6, $\phi(W_h h_{t-1} + W_x x_t + b)$ denotes a hidden state vector that is not scaled and that is subject to scaling. In the main neural network, $W_h$ and $W_x$ are trained in advance, and the scaling factor $\psi(d_h(z_h))$ is used to scale the hidden state vector $\phi(W_h h_{t-1}+W_x x_t+b)$ that is calculated based on the trained $W_h$ and $W_x$. For example, when $\hat{h}_t$ instead of $d_h(z_h)$ is used as a scaling factor, $\psi(\hat{h}_t)$ or $\hat{h}_t$ instead of $\psi(d_h(z_h))$ is substituted into Equation 6. When $\phi(W_h h_{t-1}+W_x x_t+b)$ is to be scaled, an amount of calculation is less than that of $W_h$ and $W_x$.

In $\psi(d_h(z_h))$ of Equation 6, $d_h(z_h)$ is used to determine a degree of scaling, and $\psi$ is used to limit a scaling range. An excessively large scaling result or an excessively small scaling result may lead to a decrease in an accuracy of recognition. For example, a scaling range may be properly maintained based on $\psi$. $\psi$ may be calculated based on the below Equation 7, for example.

$$\psi(x)=2/(1+\exp(-x)) \qquad \text{Equation 7:}$$

Referring to FIG. 4, a scaling factor is determined based on the hidden unit 430 in the sub-neural network, and a hidden state vector of the hidden unit 420 in the main neural network is determined based on the determined scaling factor and a hidden state vector of the hidden unit 410 in the main neural network. Although a scaling factor for the hidden unit 420 and the hidden state vector of the hidden unit 420 are determined as shown in FIG. 4, hidden state vectors and scaling factors for all remaining hidden units in the main neural network are respectively determined based on the above descriptions and illustrations with respect to FIG. 4. A recognition result is determined based on an output corresponding to the hidden state vector of the hidden unit 420 at the time step t and the hidden state vectors of remaining hidden units at the time step t and an output corresponding to the hidden state vector of the hidden unit 430 at the time step t.

In an example, the sub-neural network is a DNN. In this example, the sub-neural network includes layers respectively corresponding to the main neural network. An identity vector as a sub-input vector is input to the sub-neural network. The sub-neural network outputs a component to determine a scaling factor in response to the identity vector being input, and a scaling factor is determined based on an output of the sub-neural network. Also, the sub-input vector may have the same value regardless of time step, and accordingly a scaling factor may be determined once with respect to speech data for multiple time steps or multiple frames, for example. This above scaling factor for multiple time steps in the DNN example is referred to as a representative scaling factor. The representative scaling factor may be acquired and stored in advance before a recognition operation of the main neural network, and is applied to the main neural network while the main neural network performs recognition of speech data. Alternatively, the representative scaling factor may be acquired/determined during the recognition operation.

In an example, the representative scaling factor may be acquired at predetermined intervals in a speech recognition process of a predetermined user. For example, the representative scaling factor may be acquired for each utterance, for each point in time designated by a user, or at predetermined intervals designated by a user. An acquired representative scaling factor may be stored in a storage, for example, a memory, and may thereafter be continued to be used until new representative scaling factor is acquired, at which time the new representative scaling factor is used until a next new representative scaling factor is acquired. Thus, with such an example, it may be possible to reduce costs for calculation in comparison to an example in which a scaling factor is determined for every time step and applied to the main neural network.

Figure 5:
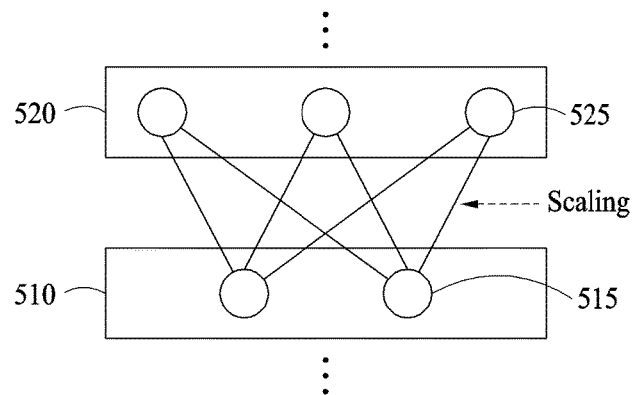
FIG. 5 is a diagram illustrating an example of a speech recognition process in a deep neural network (DNN).

FIG. 5 illustrates an example of a speech recognition process in a DNN. In FIG. 5, a main neural network is illustrated as a DNN. The sub-neural network may be a DNN or an RNN. Referring to FIG. 5, the main neural network includes hidden layers 510 and 520.

The sub-neural network outputs a component as the scaling factor, or for use in determining the scaling factor, based on an identity vector. When the sub-neural network is a DNN, the above description with respect to FIG. 4 are, with an exception of the discussed recurrent connection characteristics, applicable to an operation of the sub-neural network of FIG. 5. When the scaling factor is determined, the scaling factor is applied to an output of each node in a corresponding hidden layer of the main neural network. For example, the scaling factor may be applied to an existing trained weighted connection between an output from a node 515 and a node 525. The scaling factor may be determined for all outputs transferred through all weighted connections between the hidden layer 510 and the hidden layer 520, for example, or may be respectively determined for each weighted connection between each node of the hidden layer 510 and the hidden layer 520, or determined based on a combination of the same. As noted, such weighted connections of the main neural network are trained in advance together with weighted connections of the sub-neural network, e.g., with resulting scaling factors being determined and applied during such trainings. Thus, during recognition, a scaling factor is used to scale an output vector of a hidden layer calculated based on the trained weights of the main neural network, with the scaling factor having been acquired based on training weights of the sub-neural network. In response to the appropriate scaling factors being applied, an individual characteristic of a user, from among plural users, may be reflected on a recognition result of the main neural network.

Figure 6:
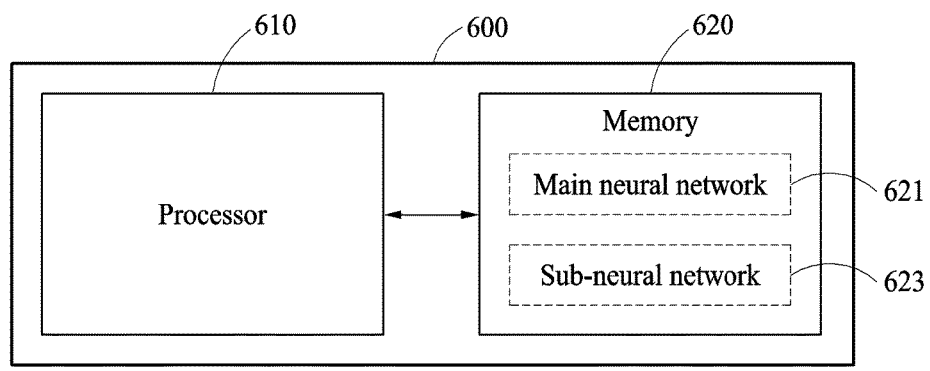
FIG. 6 is a diagram illustrating an example of a speech recognition apparatus.

FIG. 6 illustrates an example of a speech recognition apparatus 600. Referring to FIG. 6, the speech recognition apparatus 600 includes a processor 610 and a memory 620. The processor 610 and the memory 620 may respectively represent one or more processors and one or more memories.

The memory 620 is configured to store trained parameters of a main neural network 621 and a sub-neural network 623, as described above. The processor 610 may obtain or read the stored trained parameters of the main neural network 621 and the sub-neural network 623 from the memory 620, and upon implementation of the obtained or read parameters be configured to include the main neural network 621 and the sub-neural network 623. For example, the processor 610 may be configured to implement the main neural network 621 and the sub-neural network 623 by obtaining or reading the stored trained parameters and applying the same to input audio, to implement the main neural network 621 and the sub-neural network 623 to perform recognition of the audio. Thus, the processor 1110 may be configured to acquire such trained parameters associated with the main neural network 621 and the sub-neural network 623 from the memory 620, and process operations associated with the main neural network 621 and the sub-neural network 623. The processor 610 may be further configured to extract an identity vector from the speech data, with the identify vector representing an individual characteristic of a user extracted or discerned from the speech data. The processor 610 may be further configured to generate and input a sub-input vector including the identity vector to the configured sub-neural network 623, determine a scaling factor based on an output of the sub-neural network 623, input the speech data to the configured main neural network 621 to which the scaling factor is applied, and acquire a recognition result of the speech data output from the main neural network 621. For example, the memory 620 may further store parameters of a language model and a decoder, or the main neural network may further include such a language model and decoder. For example, the processor 610 may generate a final recognition result using the language model and the decoder, such as a recognition result of a word or phrase recognition. The above descriptions with respect to FIG. 1-5 are also applicable to the speech recognition apparatus 600, as the speech recognition apparatus 600 may be configured to implement any combination or all operations described herein, and accordingly such descriptions are not repeated here merely for brevity purposes.

Figure 7:
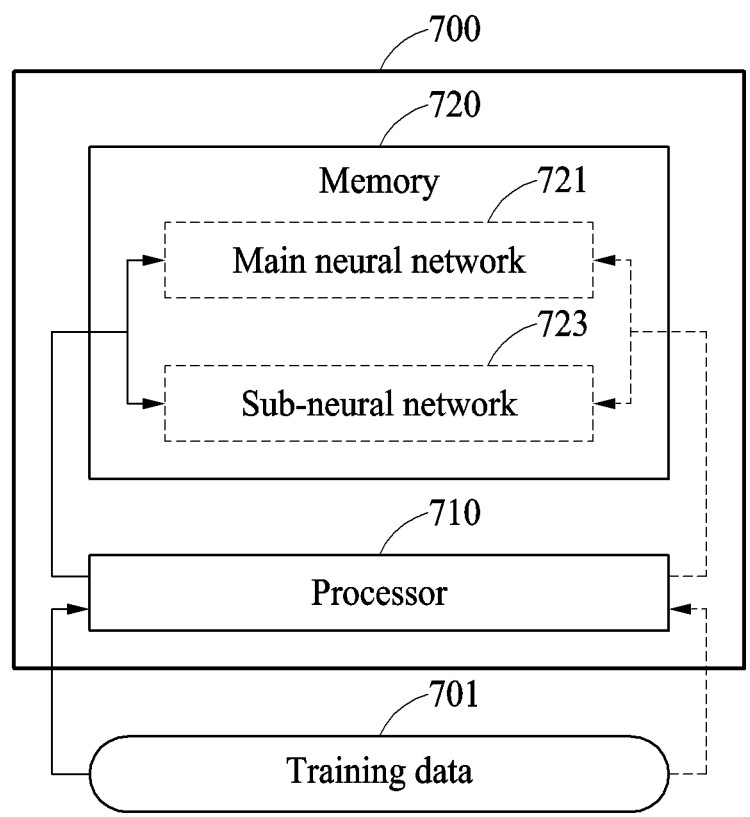
FIG. 7 is a diagram illustrating an example of a training apparatus.

FIG. 7 illustrates an example of a training apparatus 700. Referring to FIG. 7, the training apparatus 700 includes a processor 710 and a memory 720. The processor 710 and the memory 720 may respectively represent one or more processors and one or more memories.

The memory 720 is configured to store parameters of a main neural network 721 and a sub-neural network 723, as noted above. For example, the memory 720 may store in-training parameters of the main neural network 721 and the sub-neural network 723, as the respective parameters are adjusted during the training process, such as through respective back-propagation processes. Final trained parameters of the main neural network 721 and the sub-neural network 723 may also be stored in the memory 720. In an example, with the final trained parameters of the main neural network 721 and the sub-neural network 723, the main neural network 721 and the sub-neural network 723 may be the same as the main neural network 621 and the sub-neural network 623 of FIG. 6. Thus, the processor 710 may acquire initial parameter values, or set such initial parameter values, for the main neural network 721 and the sub-neural network 723 from the memory 720. In an example, the initial parameter values may be parameter values that represent that either of the main neural network 721 and the sub-neural network 723 have already been separately trained or partially trained for the particular recognition and scaling factor objectives, or the respective initial parameters may be randomly set, as non-limiting examples. Then the processor 710 trains the main neural network 721 and the sub-neural network 723 together based on training data. Training data 701 may include a training input and a training output. The training input is data that is input to the main neural network 721 and the sub-neural network 723, and includes, for example, training speech data. The training output is data that is mapped to the training input, and includes, for example, a label that needs to be output from the main neural network 721 in response to a particular training input being input to the main neural network 721 and the sub-neural network 723, representing at supervised training process. For example, when speech data is input as a training input, pronunciation probabilities of a sentence corresponding to the input speech data may be output as a training output.

The processor 710 trains the main neural network 721 and the sub-neural network 723 to calculate the training output from the training input. The training of the main neural network 721 and the sub-neural network 723 includes, for example, training parameters of each of the main neural network 721 and the sub-neural network 723, updating the main neural network 721 and the sub-neural network 723, or updating parameters of each of the main neural network 721 and the sub-neural network 723. For example, the updating may be performed through a back propagation loss process, to recursively or iteratively adjust the parameters until the main neural network 1221 and the sub-neural network 1223 are trained and the final respective trained parameters are determined, e.g., until the respective neural networks have respective predetermined levels of accuracy or predetermined levels of inaccuracy, as only non-limiting examples.

During the training, the processor 710 extracts an identity vector from speech data of a training input, provides a sub-input vector including the identity vector to the sub-neural network 723, and trains the sub-neural network 723 so that the sub-neural network 723 outputs a component to determine a scaling factor for the particular identity vector. The training apparatus 700 thus applies the scaling factor to the main neural network 721, and trains the main neural network 721 to output a training recognition result corresponding to the speech data. The main neural network 721 operates based on an output of the sub-neural network 723, and accordingly the main neural network 721 and the sub-neural network 723 may be simultaneously trained together.

The training input includes various types of speech data. Accordingly, the sub-neural network 723 may be trained to output a component for scaling factors suitable for various user characteristics, and the main neural network 721 may be trained to output an appropriate recognition result suitable for such varied user characteristics. Thereby, when the recognition apparatus performs recognition of captured speech, for example, the appropriate scaling factors may be applied depending on the determined identify vector, enabling the main neural network to be accurate for various speakers with various speaking characteristics.

Figure 8:
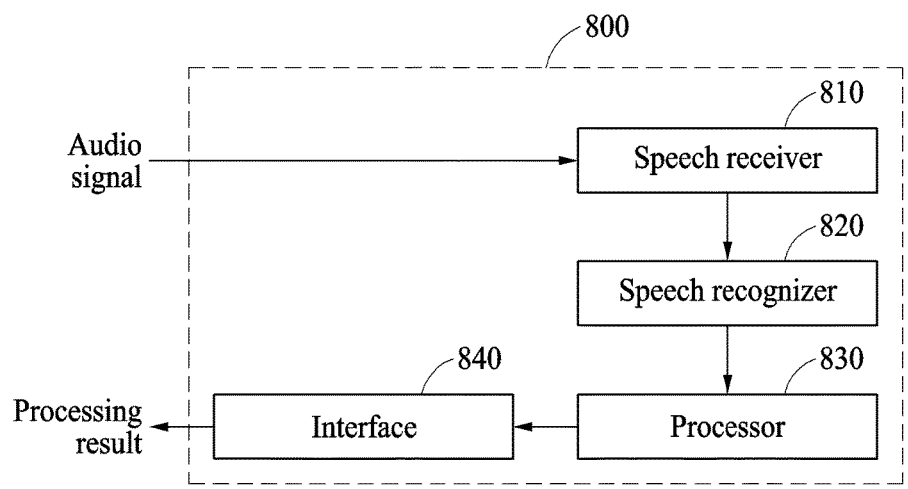
FIG. 8 illustrates an example of an electronic device.

FIG. 8 illustrates an example of an electronic device.

Referring to FIG. 8, in an embodiment, the electronic device 800 includes a speech receiver 810, a speech recognizer 820, and a processor 830, in which the speech recognizer 820 may correspond to any of the speech recognition apparatuses and/or training apparatuses described above with respect to FIGS. 1-7. The speech recognizer 820 is hardware that may be implemented by a particular one or more processing devices such as discussed above, or may be implemented by a particular one or more processing devices as discussed above that are also configured to control other operations of the electronic device 800, such as user interface operations in response to recognized commands or queries through the recognition results of the speech recognizer 820, though embodiments are not limited thereto.

The speech receiver 810 may receive a user's audio signal input through a microphone and the like included in the electronic device 800, and also represented by the speech receiver 810. Alternatively, in one or more embodiments, the speech receiver 810 may be included in a separate device of the corresponding speech recognition system embodiment, such as a wired or wireless microphone or controller that is configured to transmit the received or captured audio and/or corresponding preprocessed audio of the received/captured audio when the speech receiver 810 is further configured, in an example, to implement preprocessing of the received/captured audio, to the speech recognition device of the speech recognition system. In an example, the audio signal may be related to words, phrases, or sentences or commands for controlling the electronic device 800 or another electronic device. In addition, as only an example, such preprocessing may include converting a received or captured analog audio signal, e.g., audibly input by a user, into a digital signal, dividing the digital signal into a plurality of audio frames or windows, and transmitting the audio frames to the speech recognizer 820, e.g., as preprocessed audio frame data. Stored audio or stored preprocessed audio may alternatively be provided to the speech recognizer 820, e.g., without capturing by the speech receiver 810. In addition, in one or more embodiments one or more of an example sub-neural network and the main neural network, e.g., including an acoustic and/or language model, and a decoder may be implemented by one or more remote servers, as the speech recognizer 820, or by the speech recognizer 820 of the electronic device 800. In an example where the speech recognizer 820 is configured on or as a remote server, the electronic device 800 may be configured to transmit captured audio, for example, and receive the appropriate outputs from the example acoustic model, both acoustic model and language model, or decoder model, as one or more neural network(s).

Thus, in differing embodiments, the speech recognizer 820 may input results of the acoustic model, or results of the acoustic model and language model into a decoder or subsequent layer(s) of a corresponding unified neural network, and may output a final recognition result of an audio signal based on the output results of the decoder or unified model.

In addition, in an example the processor 830 may be specially controlled or configured to include or operate as the speech recognizer 820. The processor 830 may additionally be configured to control and/or perform additional operations of the electronic device 800, e.g., including operations that may control current or further operations of the electronic device 800, in addition to the recognition operation, in response to the final recognition result returned by the speech recognizer 820. For example, the processor 830 may output the recognition result of speech input by a user in a processor generated voice through a speaker of the electronic device 800 and the like, or may provide the recognition result in a text format on a display of the electronic device 800, such for drafting messages or documents, or merely for display by the electronic device 800. Further, the processor 830 may be configured to perform alternative operations, such as controlling the electronic device 800 to perform additional non-speech recognition operations or to process commands (e.g., power on/off, volume control, music selection, etc.) regarding the electronic device 800. Thus, recognition apparatus 800 may indicate the result of the recognition either through explicit or inferential indications, e.g., with an example explicit indication being the example of recognition apparatus 800 displaying or audibly outputting the result, while the inferential indication may include such alternative or additional example operations of the electronic device 800 being selectively implemented based on the result. The interface 840 represents the speaker, one or more user interfaces of the electronic device 800, such as a display, keyboard, and/or touch screen, and/or one or more communication hardware modules of the electronic device 800, such as to perform the above referenced transmissions with the example server, as only non-limiting examples. In an example, the interface 840 may also further represent the microphone that generates the audio signal preprocessed by the speech recognizer 810.

The memory of the electronic device 800, such as demonstrated by the memories 620 and 720 of FIGS. 6 and 7 or another memory of the electronic device 800, may also store representative scaling factor(s) as well as parameters of one or more sub-neural networks and main neural networks, including the acoustic and/or language models, as well as data used to train the neural networks or resulting from such training, and any information used or generated by the speech recognizer 820, for example. The memory may also store executable instructions so one or more processors of the electronic device 800 may implement any of the above described operations, as well as instructions for implementing or executing further applications of the electronic device 800.

The speech recognition apparatuses, including the speech recognition apparatuses 100 and 600, the processor 610, the memory 620, the training apparatus, including the training apparatus 700, the processor 710, the memory 720, the electronic device 800, the speech receiver 810, the speech recognizer 820, the processor 830, and the interface 840, and other components described herein with respect to FIGS. 1-8 and that perform the operations described in this application are implemented by hardware components. Examples of hardware components include controllers, sensors, generators, drivers, and any other electronic components configured to perform the operations described in this application. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described in this application. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The processes and methods demonstrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented speech recognition method comprising:
    extracting an identity vector representing an individual characteristic of a user from speech data;
    implementing a sub-neural network by inputting a sub-input vector including at least the identity vector to the sub-neural network;
    determining a scaling factor based on a result of the implementing of the sub-neural network;
    implementing a main neural network, configured to perform a recognition operation, by applying the determined scaling factor to the main neural network and inputting the speech data to the main neural network to which the determined scaling factor is applied; and
    indicating a recognition result of the implementation of the main neural network.

2. The speech recognition method of claim 1, wherein the extracting of the identity vector includes generating the identify vector as representing a variability of a Gaussian mixture model (GMM) supervector connecting average values of Gaussian components modeling a distribution of acoustic parameters of the speech data based on a GMM.

3. The speech recognition method of claim 1, wherein
    the main neural network is a recurrent neural network (RNN), and
    the applying of the determined scaling factor to the main neural network includes adjusting a state of a hidden unit in the RNN based on the determined scaling factor.

4. The speech recognition method of claim 1, wherein
    the main neural network is an RNN, with weights of the RNN having been trained in advance of the recognition operation, and
    the applying of the determined scaling factor to the main neural network includes scaling a hidden state vector of a hidden unit in the RNN calculated based on the weights.

5. The speech recognition method of claim 1, wherein
    the main neural network is a deep neural network (DNN), and
    the applying of the determined scaling factor to the main neural network includes adjusting an output of a hidden layer in the DNN based on the determined scaling factor.

6. The speech recognition method of claim 1, wherein
    the main neural network is a DNN, with weights of the DNN having been trained in advance of the recognition operation, and
    the applying of the determined scaling factor to the main neural network includes scaling an output vector of a hidden layer in the DNN calculated based on the weights.

7. The speech recognition method of claim 1, wherein the recognition result reflects consideration of the individual characteristic of the user in the recognition operation, corresponding to the extracted identity vector.

8. The speech recognition method of claim 1, wherein the sub-input vector further comprises the speech data.

9. The speech recognition method of claim 1, wherein the scaling factor comprises, with respect to the applying of the determined scaling factor, a first parameter controlling a degree of scaling and a second parameter controlling a scaling range.

10. The speech recognition method of claim 1, wherein
the sub-neural network is a neural network with parameters having been trained, prior to the recognition operation, to output a component determinative of the scaling factor and in response to the input of the sub-input vector to the sub-neural network, and
the main neural network is a neural network with parameters having been trained, prior to the recognition operation, to output the recognition result in response to the inputting of the speech data to the main neural network to which the scaling factor is applied.

11. The speech recognition method of claim 1, wherein the sub-neural network and the main neural network are neural networks with respective parameters resulting from the sub-neural network and the main neural network being simultaneously trained together.

12. A non-transitory computer-readable storage medium storing instructions, which when executed by a processor, cause the processor to perform the speech recognition method of claim 1.

13. A speech recognition apparatus comprising:
a processor configured to:
extract an identity vector representing an individual characteristic of a user from speech data;
implement a sub-neural network by inputting a sub-input vector including at least the identity vector to the sub-neural network;
determine a scaling factor based on a result of the implementing of the sub-neural network;
implement a main neural network, configured to perform a recognition operation, by applying the determined scaling factor to the main neural network and inputting the speech data to the main neural network to which the determined scaling factor is applied; and
indicate a recognition result of the implementation of the main neural network.

14. The speech recognition apparatus of claim 13, further comprising a memory configured to store instructions, which when executed by the processor, cause the processor to perform the extracting of the identity vector, the implementing of the sub-neural network, the determining of the scaling factor, the implementing of the main neural network, and the indicating of the recognition result.

15. The speech recognition apparatus of claim 13, further comprising a memory, the memory storing trained parameters of the sub-neural network and trained parameters of the main neural network.

16. The speech recognition apparatus of claim 13, wherein, to perform the extracting of the identify vector, the processor is configured to generate the identify vector as representing a variability of a Gaussian mixture model (GMM) supervector connecting average values of Gaussian components modeling a distribution of acoustic parameters of the speech data based on a GMM.

17. The speech recognition apparatus of claim 13, wherein
the main neural network is a recurrent neural network (RNN), and
to perform the applying of the determined scaling factor to the main neural network, the processor is configured to adjust a state of a hidden unit in the RNN based on the determined scaling factor.

18. The speech recognition apparatus of claim 13, wherein
the main neural network is an RNN, with weights of the RNN having been trained in advance of the recognition operation, and
to perform the applying of the determined scaling factor to the main neural network, the processor is configured scale a hidden state vector of a hidden unit in the RNN calculated based on the weights.

19. The speech recognition apparatus of claim 13, wherein
the main neural network is a deep neural network (DNN), and
to perform the applying of the determined scaling factor to the main neural network, the processor is configured to adjust an output of a hidden layer in the DNN.

20. The speech recognition apparatus of claim 13, wherein
the main neural network is a DNN, with weights of the DNN having been trained in advance of the recognition operation, and
to perform the applying of the determined scaling factor to the main neural network, the processor is configured to scale an output vector of a hidden layer in the DNN calculated based on the weights.

21. The speech recognition apparatus of claim 13, wherein the recognition result reflects consideration of the individual characteristic of the user in the recognition operation, corresponding to the extracted identity vector.

22. The speech recognition apparatus of claim 13, wherein the sub-input vector further comprises the speech data.

23. The speech recognition apparatus of claim 13, wherein the scaling factor comprises, with respect to the applying of the determined scaling factor, a first parameter controlling a degree of scaling and a second parameter controlling a scaling range.

24. The speech recognition apparatus of claim 13, wherein
the sub-neural network is a neural network with parameters having been trained, prior to the recognition operation, to output a component determinative of the scaling factor and in response to the input of the sub-input vector to the sub-neural network, and
the main neural network is a neural network with parameters having been trained, prior to the recognition operation, to output the recognition result in response to the inputting of the speech data to the main neural network to which the scaling factor is applied.

25. The speech recognition apparatus of claim 13, wherein the processor is further configured to train the sub-neural network and the main neural network simultaneously together based on respectively extracted identity vectors of different user training speech data used in the training.

26. A processor implemented speech recognition method comprising:
extracting an identity vector representing an individual characteristic of a user from speech data;
generating a scaling factor based on a result of an implementing of a sub-neural network input the identify vector; and implementing a main neural network, configured to perform a recognition operation, by applying the determined scaling factor to the main neural network and inputting the speech data to the main neural network to which the determined scaling factor is applied, wherein the sub-neural network and the main neural network are neural networks with respective parameters resulting from the sub-neural network and the main neural network being simultaneously trained together for performing respectively individualized speech recognition of different training user speeches each with respectively different individual characteristics.

27. The speech recognition method of claim 26, wherein the extracting of the identity vector includes generating the identify vector as representing a variability of a Gaussian mixture model (GMM) supervector connecting average values of Gaussian components modeling a distribution of acoustic parameters of the speech data based on a GMM.

28. The speech recognition method of claim 26,
wherein the generating of the scaling factor includes generating a first scaling factor and a second scaling factor respectively based on results of different network portions of the sub-neural network, and wherein the applying of the determined scaling factor to the main neural network includes applying the first scaling factor to a first hidden layer of the main neural network and applying the second scaling factor to a second hidden layer of the main neural network.

* * * * *